Oct. 18, 1932.          R. L. WEBB          1,883,839
                   PROTECTIVE ARRANGEMENT
             Filed Jan. 30, 1930        2 Sheets-Sheet 1

Inventor:
Roy L. Webb;
by Charles E. Tullar
His Attorney

Oct. 18, 1932.        R. L. WEBB        1,883,839
PROTECTIVE ARRANGEMENT
Filed Jan. 30, 1930        2 Sheets-Sheet 2

Inventor:
Roy L. Webb,
by Charles E. Tullar
His Attorney.

Patented Oct. 18, 1932

1,883,839

UNITED STATES PATENT OFFICE

ROY L. WEBB, OF BROOKLYN, NEW YORK, ASSIGNOR TO GENERAL ELECTRIC COMPANY, A CORPORATION OF NEW YORK

PROTECTIVE ARRANGEMENT

Application filed January 30, 1930. Serial No. 424,695.

My invention relates to improvements in protective arrangements for electric circuits and more particularly for controlling polyphase circuits in response to the magnitude and direction of power and an object of my invention is to provide an improved protective arrangement for discriminating between power reversals due to real and apparent faults with a high degree of sensitivity such that circuit controlling operation is prevented until the reverse power becomes excessive for conditions accompanying the reversal. A further object of my invention is to provide improved protective apparatus in which the structure and adjustment of the feature for preventing the circuit controlling operation until desired is substantially independent of the other features of the apparatus so as not to interfere with its regular functions and adjustments.

In the application of low voltage alternating current network distribution systems, it has been found that the feeder circuit breaker which is arranged to be opened with power in the direction from the network to the feeder frequently opened when there was no real fault on the feeder. This is due to regeneration from electric elevator systems, to surges and to circulatory currents in the network all of which tend to produce apparent fault conditions. In order to avoid this unnecessary circuit breaker operation, I provide, according to my invention, protective apparatus with a restraining feature which may be made sufficient to prevent the opening of the circuit breaker except for actual faults on the feeder and which has its restraint decreased in dependence on the severity of the fault. Further according to my invention, the structure and adjustment of the restraining feature is made substantially independent of the other features of the protective apparatus so as to insure the necessary flexibility and yet avoid interference with the other functions of the apparatus.

My invention will be better understood from the following description when considered in connection with the accompanying drawings and its scope will be pointed out in the appended claims.

Figure 1:
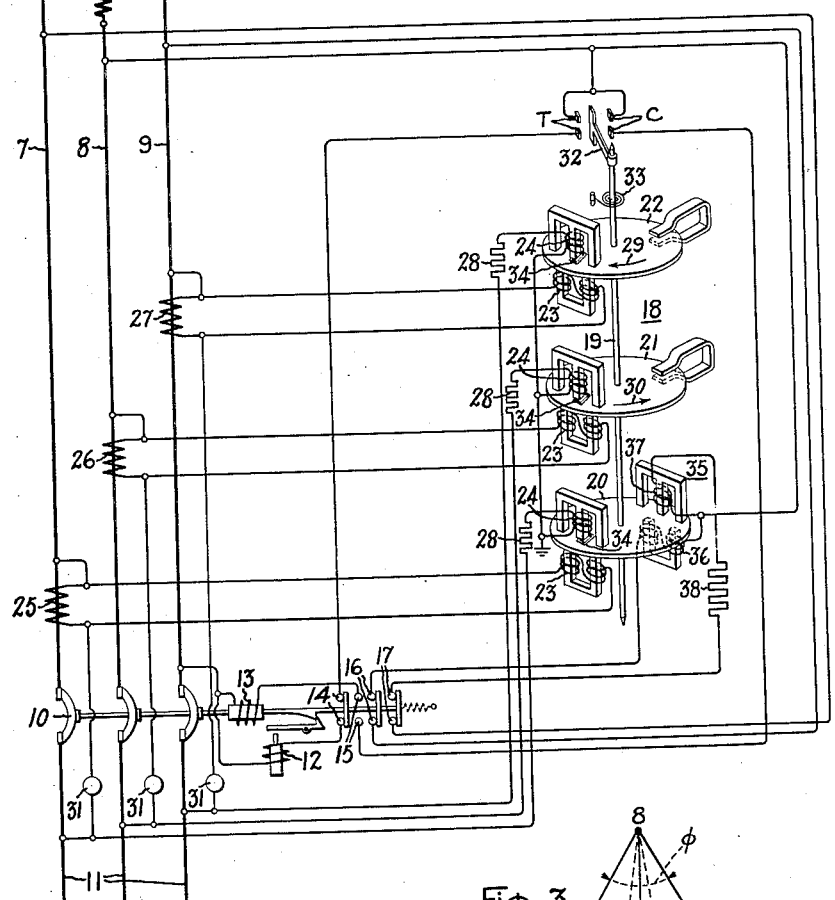
Figure 2:
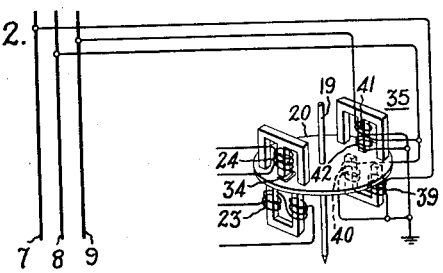
Figure 3:
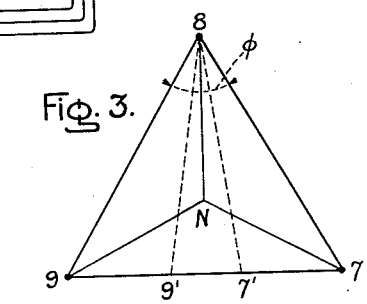
Figures 4, 5, 6:
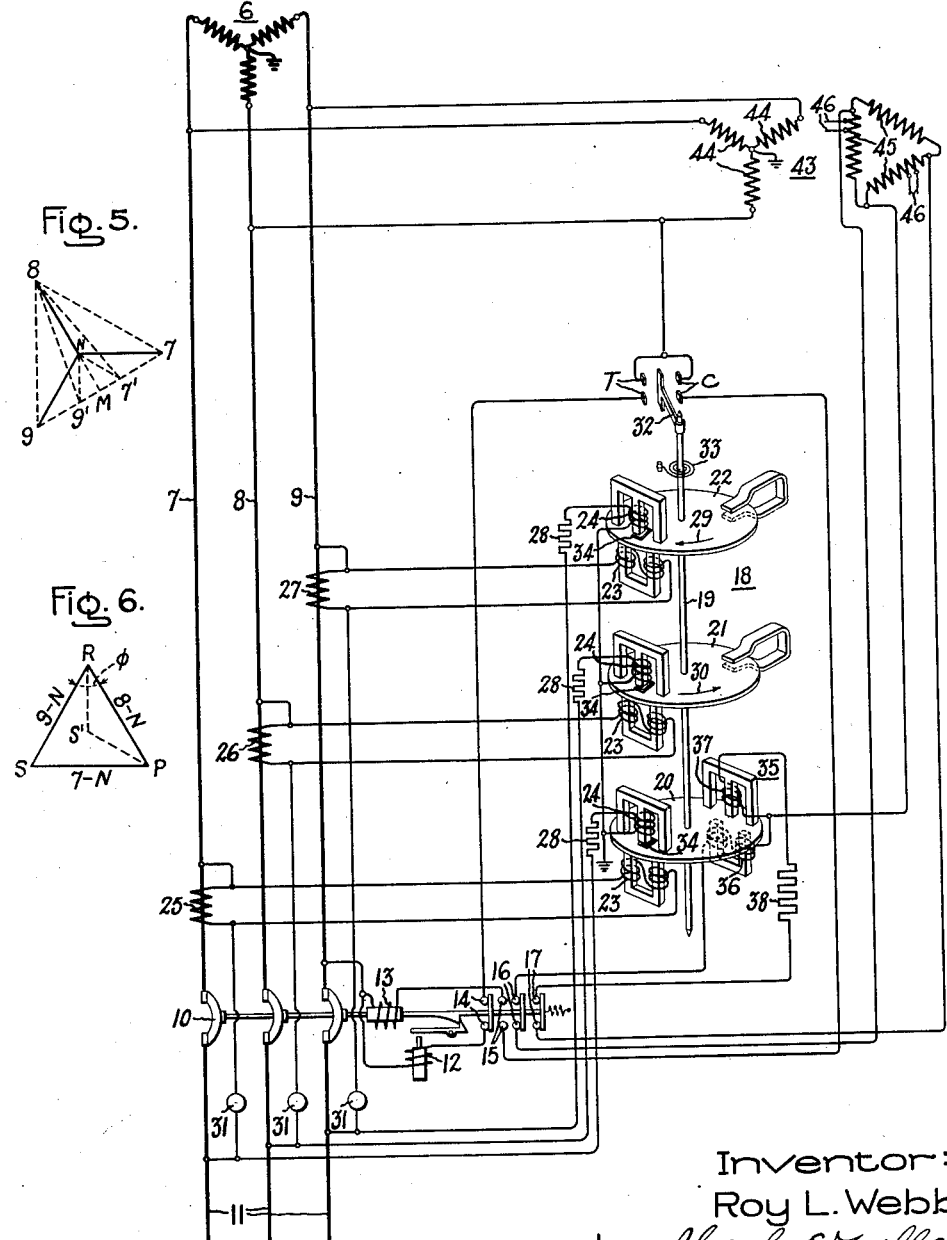

In the accompanying drawings, Fig. 1 illustrates diagrammatically a protective arrangement embodying my invention; Fig. 2 is a modification of a part of the embodiment of my invention shown in Fig. 1; and Fig. 3 is a diagram explanatory of the embodiments of my invention shown in Figs. 1 and 2; Fig. 4 illustrates diagrammatically another embodiment of my invention and Figs. 5 and 6 are diagrams explanatory of the embodiment of my invention shown in Fig. 4.

For the purpose of illustrating my invention, I have chosen in Fig. 1 to show its application to a three-phase distribution system of the so-called low voltage type although it is distinctly to be understood that my invention is not so limited. As shown schematically, the distribution system comprises a suitable source 4, a high voltage feeder 5, a step-down transformer 6, a low voltage feeder having phase conductors 7, 8, 9 and suitable circuit controlling means 10 for connecting the feeder to the low voltage network 11. The circuit controlling means 10 is shown as a latched closed type of circuit breaker having a trip coil 12, a closing coil 13 and auxiliary switch contacts 14, 15, 16, 17 whose functions will hereinafter appear.

In order to control the circuit breaker 10 so as to effect the opening thereof when the direction of power is from the network 11 to the feeder 7, 8, 9, there is provided the relay device 18. As shown, this device is a polyphase power directional relay of the induction disk type and includes a suitably damped movable element such as the shaft 19 which carries a plurality of disks 20, 21, 22. Each of these disks is provided with an electro-magnetic torque producing means or motor element including cooperating current and potential windings 23, 24 respectively. The current windings 23 of the motor elements are respectively connected to be energized in accordance with the currents in the respective phase conductors 7, 8, 9 through suitable means such as current transformers 25, 26, 27. The corresponding potential windings 24 are connected to be energized in accordance with the voltages to ground of the corresponding phase conductors. In some cases the circuits of the potential windings 24 may include suitable phase displacing means such as resistances 28 such that the torques on the disks 20, 21, 22 are not strictly according to the powers of the respective phase conductors. If the circuit breaker 10 is closed and the direction of the net power of the circuit 7, 8, 9 is from the feeder to the network 11, the resultant torque of the motor elements is in the direction indicated by the arrow 29 and vice versa for the direction of the net power of the circuit from the network 11 to the feeder as indicated by the arrow 30.

In order that the relay 18 may also include the closing function, that is effect the closing of the circuit breaker 10 when the voltage of the circuit 7, 8, 9 is higher than the voltage of the network 11, the current windings 23 are connected across the respective poles of the circuit breaker 10, suitable current limiting means such as ballistic resistors 31 being employed to prevent any appreciable power flow and also to protect the current windings 23 against excessive currents and to prevent high voltages from being induced in the primary windings of transformer 6 when the supply 4 is not connected to feeder 5 and the circuit breaker 10 is open. When the cirbreaker 10 is open and the voltage of the circuit 7, 8, 9 is higher than the voltage of the network 11, the torque exerted by the cooperating current and potential windings is in the direction indicated by the arrow 29 and vice versa when the voltage of the network is higher than that of the circuit 7, 8, 9 as indicated by the arrow 30.

For circuit controlling operation, the movable element or shaft 19 carries a contact controlling member 32 which is arranged to control the tripping and closing contacts T and C respectively in the circuits of the tripping and closing coils 12 and 13 which include the circuit breaker auxiliary switch contacts 14 and 15 to relieve the comparatively delicate relay contacts from the heavy duty of interrupting the circuits of these coils. In order to insure immediate reclosure upon energization of the circuit 7, 8, 9, assuming that the network 11 is not energized, a control spring 33 is provided to exert a torque in the direction indicated by the arrow 29. In case the feeder 5 is not energized but the network 11 is, then the potential coils 24, acting in effect as shaded pole motor elements in conjunction with the short-circuited windings or starting plates 34 exert torques in the direction indicated by the arrow 30 tending to hold the contact controlling member 32 in a neutral position intermediate the T and C contacts.

In accordance with my invention, I provide means which is independent of the current and potential windings 23 and 24 for exerting an effect which is dependent on two different voltages of the circuit 7, 8, 9 and the phase angle between the two voltages and which is opposed to the effect of the windings 23 and 24 when the power of the circuit 7, 8, 9 is in a given direction. As shown in Fig. 1, this means includes an electromagnetic torque producing or motor element 35 inductively associated with one of the disks such as 20 and including two cooperating windings 36, 37 for exerting a torque dependent on the area of the vector triangle, shown in Fig. 3, of the phase to phase voltages of the circuit 7, 8, 9. Since this area is proportional to the product of any two adjacent voltages and the sine of the phase angle between them, I connect the windings 36, 37 to be energized in accordance with the voltages between the phase conductors 8 and 9, and 7 and 8 respectively. The circuit of either of the windings may include suitable phase displacing means such as a resistance 38 to insure that the torque of the motor element 35 is proportional to $E_{7-8} E_{8-9}$ sine $\phi$, $\phi$ being the phase angle between the voltages $E_{7-8}$ and $E_{8-9}$. Since the function of this torque is to prevent unnecessary tripping on a power reversal which is really not a fault, the direction of the torque as indicated by the arrow 29 is such as to oppose the net power torque when the direction of power is from the network 11 to the circuit 7, 8, 9. Inasmuch as the effect of the restraining element 35 is to tend to close the contacts C, it may be desirable to eliminate this effect when the circuit breaker 10 is open so as not to interfere with the normal reclosing action. For this purpose, the circuits of the windings 36, 37 may include the circuit breaker auxiliary switch contacts 16 and 17 respectively which are closed when the circuit breaker is closed and open when the circuit breaker is open.

Assuming that the parts are positioned as shown in Fig. 1 and that a reversal of power occurs, that is, power is fed from the network 11 to the circuit 7, 8, 9 then the relay 18 tends to close its contacts T. If this reversal of power is due to regeneration, surges or circulatory currents, the magnitudes of the voltages of the circuit 7, 8, 9 may increase but do not materially decrease and the phase relations remain substantially the same. Consequently, the restraining element 35 exerts a strong effect opposed to the reverse power torque and the contacts T are not closed. If, however, any disturbance such as a fault on the high voltage feeder 5 occurs, one or more of the voltages of the circuit 7, 8, 9 decrease and the restraining torque of the element 35 is reduced. This will be more clearly understood from a further consideration of Fig. 3. For example, assuming a ground fault on any one of the phase conductors of the feeder 5, then some one of the voltages 7—N, 8—N, 9—N is decreased and the area of the triangle 7—8—9 is decreased accordingly. Thus, if the severity of the fault is such that any one of these voltages such as 7—N becomes zero and the other two phases are unaffected, the area of the triangle would be 8—N—9. This is one-third of normal and the restraining torque would likewise be one-third of normal. In case of interphase faults, one or more of the voltages 7—8, 8—9, 9—7 is reduced and the area of the triangle 7—8—9 is reduced accordingly. This assuming a fault such that the voltage 9—7 is reduced to 9'—7', the resultant triangle becomes 8—9'—7' and the restraint is much less. Of course, if an interphase fault is so severe as to reduce any phase to phase voltage to zero, the area of the vector triangle of voltages becomes zero and there would be no restraint. Therefore, with apparatus embodying my invention, the restraint is available when most needed and is greatly reduced or actually disappears when it is not needed. Moreover, since the structure of the restraining element 35 is substantially independent of the power torque elements, it can be adjusted to suit the occasion without disturbing the adjustments for the closing or power torques of the relay.

In the embodiment of my invention shown in Fig. 2, each of the windings of the restraining motor element 35 is divided into two assisting parts 39, 40 and 41, 42. These are respectively connected to be energized in accordance with the voltage to ground of the phase conductors 7, 8, 9, 8. Consequently, the resultant flux of windings 39 and 40 is proportional to the resultant of the voltages 7—N and 8—N or 7—8 and the resultant flux of windings 41 and 42 is proportional to the resultant of the voltages 9—N and 8—N or 8—9. The restraining torque is, therefore, proportional to the area of the vector triangle of voltages 7—8—9, shown in Fig. 3. As described the resultant is the vectorial difference but it will be obvious that the vectorial sum may also be used.

In the embodiment of my invention, shown in Fig. 4, the restraint is made proportional to the area of the vector triangle, shown in Fig 6, of the phase to ground voltages of the circuit 7, 8, 9. In order to obtain these voltages so that a single restraining element 35 is sufficient for all interphase and ground faults, a potential transformer 43 having its primary windings 44 connected in star to the circuit 7, 8, 9 with the neutral grounded and its secondary windings 45 connected in a closed delta may be used. The circuit of either of the windings of the restraining element 35, such as 37, may include suitable phase displacing means, shown as a resistance 38, to insure that the torque of the motor element 35 is substantially proportional to $E_{8-N} E_{9-N}$ sine $\phi$, $\phi$ being the phase angle between the voltages $E_{8-N}$ and $E_{9-N}$ as reflected in the delta connected secondaries 45. Since the function of this torque is to prevent unnecessary tripping on a power reversal which is really not a fault, the direction of the torque, as indicated by the arrow 29, is such as to oppose the net power torque when the direction of power is from the network 11 to the circuit 7, 8, 9. With this arrangement it will be obvious that, by providing taps 46 on one set of the windings of the transformer 43, the sensitivity of the element 35 may readily be adjusted as desired. Inasmuch as the effect of the restraining element 35 is to tend to close the contact C, it may be desirable to eliminate this effect when the circuit breaker 10 is open so as not to interfere with the normal reclosing action. For this purpose, the circuits of the windings 36, 37 may include the circuit breaker auxiliary switch contacts 16 and 17 respectively which are closed when the circuit breaker is closed and open when the circuit breaker is open.

Assuming that the parts are positioned as shown in Fig. 4 and a reversal of power occurs, that is power is fed from the network 11 to the circuit 7, 8, 9, then the relay 18 tends to close its contacts T. If this reversal of power is due to regeneration, surges or circulatory currents, the magnitudes of the voltages of the circuit 7, 8, 9 may increase but do not materially decrease and the phase relations remain substantially the same. Consequently, the restraining element 35 exerts a strong effect opposed to the reverse power torque and the contacts T are not closed. If, however, any disturbance such as a fault on the high voltage feeder 5 occurs, one or more of the voltages of the circuit 7, 8, 9 decrease and the restraining torque of the element 35 is reduced. This will be more clearly understood from a further consideration of Figs. 5 and 6. For example, assuming a ground fault on any one of the phase conductors of the feeder 5, then some one of the voltages 7—N, 8—N, 9—N is decreased and the area of the triangle PRS of these voltages or voltages proportional thereto, as shown in Fig. 6, is decreased accordingly. Thus, if the severity of the fault is such that any one of these voltages such as 7—N becomes zero, the area of the voltage triangle PRS would be approximately zero. In other words, the restraint which is proportional to the area of the triangle PRS decreases as the voltage to ground of the faulty conductor does so that the reverse power torque of the windings 23, 24 is available to effect the tripping of the circuit breaker 10.

In case of interphase faults one or more of the voltages 7—8, 8—9, 9—7 is reduced and the area of the voltage triangle PRS is reduced accordingly. Thus, assuming a fault on the feeder 5, for example, such that the voltage 9—7 is reduced to 9'—7', the resultant triangle of phase to phase voltages of the circuit 7, 8, 9 as shown in Fig. 5 becomes 8—9'—7'. Consequently, the voltage triangle PRS Fig. 6 is reduced accordingly to the value PRS' because of the decreases in voltages 7—N and 9—N to 7'—N and 9'—N respectively. The restraining torque is, therefore, reduced in accordance with a decrease in one or more of the interphase voltages. In case of an interphase fault, such for example that one of the phase voltages 9—7 of the circuit 7, 8, 9 becomes zero, then each of the voltages 7—N and 9—N takes a position in line with 8—N as shown by the line N—M in Fig. 5. In this case the area of the triangle of the phase to phase voltages of the circuit 7, 8, 9 becomes zero and, of course, the corresponding triangle PRS Fig. 6 also becomes a straight line and the restraining torque is substantially zero.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, a polyphase circuit, controlling means therefor including a circuit interrupter and means for controlling said interrupter to effect a circuit controlling operation thereof when the power of the circuit is in a given direction including a relay having windings connected to be energized from the circuit to produce an effect dependent on the power of the circuit, and means independent of said windings for restraining the operation of said relay until the circuit power in said direction exceeds a predetermined value connected to be energized from the circuit to exert an effect dependent on two different voltages of the circuit and the phase relation between said two voltages.

2. In combination, a polyphase circuit and controlling means therefor including a relay having a movable element, windings connected to be energized from said circuit for exerting on said element an effect dependent on the magnitude and direction of the power of the circuit and means independent of said windings for exerting on said element an effect dependent on two different voltages of the circuit and the phase relation between said two voltages, said effects being opposed when the circuit power is in a given direction.

3. In combination, a polyphase circuit and controlling means therefor, including a polyphase relay having a movable element, windings connected to be energized from the circuit for exerting on said element an effect dependent on the magnitude and direction of the power of the circuit, and means independent of said windings for exerting on said element an effect dependent on two of the phase to phase voltages of the circuit and a function of the phase angle between said two voltages, said effects being opposed when the circuit power is in a given direction.

4. In combination, a three-phase circuit and controlling means therefor, including a relay having a movable element, means connected to be energized from the circuit for exerting on said element an effect dependent on the power of the circuit and means for exerting on said element an effect substantially proportional to the area of the vector triangle of three voltages of the circuit, said effects being opposed when the circuit power is in a given direction.

5. In combination, a three-phase circuit and controlling means therefor including a three-phase power directional relay having a movable element, windings connected to be energized from said circuit and arranged to exert on said element a torque dependent on the magnitude and direction of the power of the circuit and means independent of said windings for exerting on said element a torque substantially proportional to the product of two different phase to phase voltages of the circuit and the sine of the phase angle between said two voltages, said torques being opposed when the circuit power is in a given direction.

6. In combination, a three-phase circuit, controlling means therefor including a three-phase induction disk power directional relay having windings connected to be energized from the circuit and having a movable element subject to a torque dependent on the magnitude and direction of the power of the circuit, and electromagnetic means independent of said windings connected to be energized from the circuit for exerting on said element a torque substantially proportional to the product of two different phase to phase voltages of the circuit and the sine of the phase angle between said two voltages. said torques being opposed when the circuit power is in a given direction.

7. In combination, a three-phase circuit, controlling means therefor including a circuit interrupter, means for controlling said interrupter to effect the opening thereof when the power of the circuit is in a given direction including a power directional relay having windings connected to be energized from the circuit to produce an effect dependent on the power of the circuit and means for restraining the operation of said relay until the circuit power in said direction exceeds a predetermined value including electromagnetic means independent of said windings connected to be energized from the circuit to exert an effect dependent on two different phase to phase voltages of the circuit and the phase angle between said two voltages.

8. In combination, a polyphase circuit and controlling means therefor including a relay having a movable element, windings connected to be energized from the circuit for exerting on said element an effect dependent on the power of the circuit and means independent of said windings for exerting on said element another effect dependent on two different voltages of the circuit and the phase angle between said voltages, said effects being opposed when the circuit power is in a given direction.

9. In combination, a polyphase circuit and controlling means therefor, including a polyphase relay having a movable element, windings connected to be energized from the circuit for exerting on said element an effect dependent on the magnitude and direction of the power of the circuit, and means independent of said windings for exerting on said element an effect dependent on the voltages to ground of two of the phase conductors of the circuit and a function of the phase angle between said two voltages, said effects being opposed when the circuit power is in a given direction.

In witness whereof, I have hereunto set my hand this 27th day of January, 1930.

ROY L. WEBB.